United States Patent
Ohhashi

(10) Patent No.: US 7,845,676 B2
(45) Date of Patent: Dec. 7, 2010

(54) STRETCHABLE WEBBING, INFLATABLE BELT, AND INFLATABLE BELT APPARATUS

(75) Inventor: Kiyotaka Ohhashi, Tokyo (JP)

(73) Assignee: Takata Corporation, Tokyo (JP)

( * ) Notice: Subject to any disclaimer, the term of this patent is extended or adjusted under 35 U.S.C. 154(b) by 182 days.

(21) Appl. No.: 12/126,281

(22) Filed: May 23, 2008

(65) Prior Publication Data

US 2008/0303253 A1    Dec. 11, 2008

(30) Foreign Application Priority Data

Jun. 11, 2007    (JP)    ............... 2007-154385

(51) Int. Cl.
    *B60R 21/18*    (2006.01)
(52) U.S. Cl. ...................... 280/733; 442/311
(58) Field of Classification Search ........... 280/733; 66/190, 192, 193; 442/311, 313, 314
    See application file for complete search history.

(56) References Cited

U.S. PATENT DOCUMENTS 6,685,220 B2 *    2/2004    Ohhashi ............. 280/733

FOREIGN PATENT DOCUMENTS

| JP | 7-292536 | 11/1995 |
|---|---|---|
| JP | 2001-175176 | 6/2001 |
| JP | 2001-260807 | 9/2001 |
| JP | 2002-264754 | 9/2002 |
| JP | 2004-149964 | 5/2004 |
| JP | 2005-534821 | 11/2005 |

\* cited by examiner

*Primary Examiner*—Paul N Dickson
*Assistant Examiner*—Keith Frisby
(74) *Attorney, Agent, or Firm*—Fitch, Even, Tabin & Flannery

(57) ABSTRACT

A technology for a stretchable webbing is provided including a long inflatable belt for restraining a vehicle occupant, which is effective in ensuring the webbing rigidity and achieving the reduced product width of the webbing. In one embodiment, the stretchable webbing includes a long inflatable belt for restraining a vehicle occupant, a weft yarn of the stretchable webbing having a first filament element and a second filament element which extend adjacent to and in parallel with one another, where the first filament element and second filament element have different heat-shrinkage ratios.

10 Claims, 10 Drawing Sheets

STRETCHABLE WEBBING, INFLATABLE BELT, AND INFLATABLE BELT APPARATUS

FIELD OF THE INVENTION

The present invention relates to a technology for developing an inflatable belt used for restraining an occupant in the event of a vehicle collision.

BACKGROUND OF THE INVENTION

An inflatable belt apparatus with an inflatable belt of this type has been described in Japanese Patent JP-A-2001-260807. In JP-A-2001-260807, the inflatable belt (webbing) of the inflatable belt apparatus comprises a stretchable inflatable area in which a gas bag is accommodated and a non-inflatable area which is wound up by a retractor. The gas bag accommodated in the inflatable area is inflated by gas supply in the event of a vehicle collision, whereby a vehicle occupant is restrained via the inflatable belt which is thus inflated.

SUMMARY OF THE INVENTION

In designing the inflatable belt apparatus of this type, the inflatable belt is required to have performance which is efficient for reducing the product width in addition to the basic performance, i.e. having webbing rigidity capable of restraining the occupant in the event of a vehicle collision.

The present invention is made in view of the aforementioned point and it is an object of the present invention to provide a technology for a stretchable webbing composing a long inflatable belt for restraining a vehicle occupant, which is effective in reducing the product width of the webbing while ensuring the webbing rigidity.

For achieving the object, the present invention is configured. The present invention can be adapted to a technology for developing an inflatable belt or a safety belt used as a means for restraining an occupant in a vehicle such as an automobile.

A stretchable webbing of the present invention is a webbing composing a long inflatable belt for restraining a vehicle occupant, comprising at least a plurality of knitting yarns, an inserting yarn, a weft yarn, a first webbing area, and a second webbing area.

The plurality of knitting yarns are structured to form a part extending lengthwise in a predetermined direction to form the webbing framework. The plurality of knitting yarns are arranged to extend over the webbing, thereby forming the webbing framework of the stretchable webbing. The "predetermined direction" used here typically means the longitudinal direction of the inflatable belt. The inserting yarn is inserted into spaces between the plurality of knitting yarns to extend in the predetermined direction. The weft yarn includes a first extending part which is inserted into spaces between the plurality of knitting yarns to extend in a direction perpendicular to the predetermined direction and a second extending part which is continued from the first extending part and extends in the predetermined direction. The area where the first extending part of the weft yarn extends is a first webbing area and the area where the second extending part of the weft yarn extends and of which stretchability in the direction perpendicular to the predetermined direction is higher than that of the first webbing area is a second webbing area.

It is general that these yarns for forming the webbing, i.e. the knitting yarns, the inserting yarn, and the weft yarn fundamentally extend in certain directions generally while repeating regular or irregular swells and curves. Therefore, the extending form of each yarn contains not only a form that the yarn extends in one direction over the entire range but also forms that the yarn extends generally in one direction with some swells and curves. This means that the inserting yarn may be structured to extend in the predetermined direction over the entire range and may be structured to extend generally in the predetermined direction with some swells and curves.

Especially, the weft yarn is composed of a first filament element and second filament element which extend adjacent to and in parallel with each other, and the first filament element and the second filament element are different in heat-shrinkage ratio during thermal treatment. Because of this structure, a filament having relatively high heat-shrinkage ratio, as one of the first filament element and the second filament element, is preferentially shrunk during thermal treatment of the stretchable webbing. The "heat-shrinkage ratio" is a value indicating shrinkable degree of fiber during thermal treatment. Typically, relative to a test piece subjected to dipping treatment in hot water for a predetermined time period (for example, treatment in hot water of 90° C. for 30 minutes) in accordance with a method defined in JIS L1013 8.18.1(b), the evaluation is carried out according to a value (heat-shrinkage ratio) derived by an expression ((length before treatment−length after treatment)×100/length before treatment). It should be noted that the weft yarn may be composed of a single filament containing the first filament element and the second filament element and may be composed of a filament composing the first filament element and a filament composing the second filament element which are tied together.

According to the structure of the stretchable webbing of the present invention, the filament having relatively high heat-shrinkage ratio, as one of the first filament element and the second filament element, is preferentially shrunk by thermal treatment of the stretchable webbing, thereby increasing the webbing rigidity so as to improve the abrasion resistance (durability) of the stretchable webbing and reducing the reduced width in a direction (width direction) perpendicular to the predetermined direction.

In a stretchable webbing of another embodiment according to the present invention, it is preferable that a first filament composing the first filament element and a second filament composing the second filament element of the weft yarn extend adjacent to and in parallel with each other. This structure provides a stretchable webbing of which the weft yarn is composed of the first filament and the second filament which are different in heat-shrinkage ratio and which are tied together.

In a stretchable webbing of another embodiment according to the present invention, it is preferable that the weft yarn is a core-sheath structured yarn comprising a core portion occupying the center of the yarn and a sheath portion covering outside of the core portion. In this structure, the core portion is composed of the first filament element and the sheath portion is composed of the second filament element which extends adjacent to and in parallel with the first filament element. This structure provides a stretchable webbing of which the weft yarn is composed of a single core-sheath structured yarn containing the first filament element and the second filament element which are different in heat-shrinkage ratio.

In a stretchable webbing of still another embodiment according to the present invention, the first filament element has a heat-shrinkage ratio lower than that of the second filament element and a fusing point lower than that of the second filament element, and the second filament element has a heat-shrinkage ratio higher than that of the first filament element and a fusing point higher than that of the first filament element. Because of this structure, the first filament element is fused adjacent to the second filament element during thermal treatment so that the weft yarn and the knitting yarns and the inserting yarn are thermally bonded. That is, the first filament element has a function as a binder to thermally bond the weft yarn to the knitting yarns and the inserting yarn. According to this structure, the first filament element of the weft yarn is preferentially fused by thermal treatment so that the fused component functions as binder so as to thermally bond the weft yarn to other yarns (the knitting yarns and the inserting yarn). This improves the abrasion resistance and reduces the product width during thermal treatment. Further, the weft yarn is preferentially fused and is then hardened together with the knitting yarns and the inserting yarn, thereby increasing the sectional area and the hardness of the weft yarn after shrinkage and thus increasing the rigidity of the webbing as a whole. Therefore, this structure can effectively prevent occurrence of aperture between yarns of the webbing, i.e. occurrence of so-called "slippage", and preventing fray.

In a stretchable webbing of still another embodiment according to the present invention, it is preferable that the weft yarn contains highly shrinkable yarn having higher heat-shrinkage ratio during thermal treatment as compared to said knitting yarns and said inserting yarn. This structure enables the weft yarn to be shrunk by thermal treatment for the stretchable webbing prior to the other yarns (the knitting yarn and the inserting yarn). According to this structure, the weft yarn is shrunk by the thermal treatment for the stretchable webbing prior to the other yarns, thereby increasing the webbing rigidity so as to improve the abrasion resistance (durability) of the stretchable webbing and reducing the product width in a direction (width direction) perpendicular to the predetermined direction.

An inflatable belt according to the present invention is a long inflatable belt for restraining a vehicle occupant. The inflatable belt is structured as an envelope-shape or cylindrical belt member made of a stretchable webbing as mentioned above. The inflatable belt comprises a gas bag which is inflatable in the event of a vehicle collision and which is accommodated in the second webbing area of the belt member. As the gas bag is inflated in the event of a vehicle collision, the envelope-shape belt stretches at its second webbing area according to the inflation of the gas bag so that the second webbing area restrains the front surface area (area including chest, shoulders, and abdomen) of the vehicle occupant. This structure can provide an inflatable belt in which the rigidity (abrasion resistance) of the webbing as a whole is increased and which is effective in reducing the product width.

An inflatable belt apparatus of the present invention comprises at least: an inflatable belt as mentioned above, a retractor, a buckle, and a tongue. The retractor has a function of winding or unwinding the inflatable belt and comprises a spool which is accommodated in a retractor housing thereof. The retractor may comprise a driving mechanism for moving the spool and a control mechanism for controlling the movement of the spool. The tongue attached to the inflatable belt is adapted to be latched to the buckle which is fixed to a vehicle body when the inflatable belt is used. This structure provides an inflatable belt apparatus in which the rigidity (abrasion resistance) of the webbing as a whole is increased and which is effective in reducing the product width.

As described in the above, the present invention provides a stretchable webbing composing a long inflatable belt for restraining a vehicle occupant, in which a weft yarn of the stretchable webbing is composed of a first filament element and a second filament element which extend adjacent to and in parallel with each other, and the first filament element and the second filament element are different in heat-shrinkage ratio during thermal treatment, thereby achieving reduction in product width of the webbing while ensuring the webbing rigidity.

DETAILED DESCRIPTION OF THE PREFERRED EMBODIMENTS

Hereinafter, embodiments of the present invention will be described with reference to drawings.

This embodiment relates to an inflatable belt apparatus which is installed in an automotive vehicle and provides an optimal inflatable belt for composing the inflatable belt apparatus and a manufacturing method thereof.

First, the structure of an inflatable belt apparatus 100 as an embodiment of "inflatable belt apparatus" of the present invention will be described with reference to FIG. 1. The inflatable belt apparatus 100 is sometimes called "seat belt apparatus". The schematic structure of the inflatable belt apparatus 100 will be referred to FIG. 1.

Figure 1:
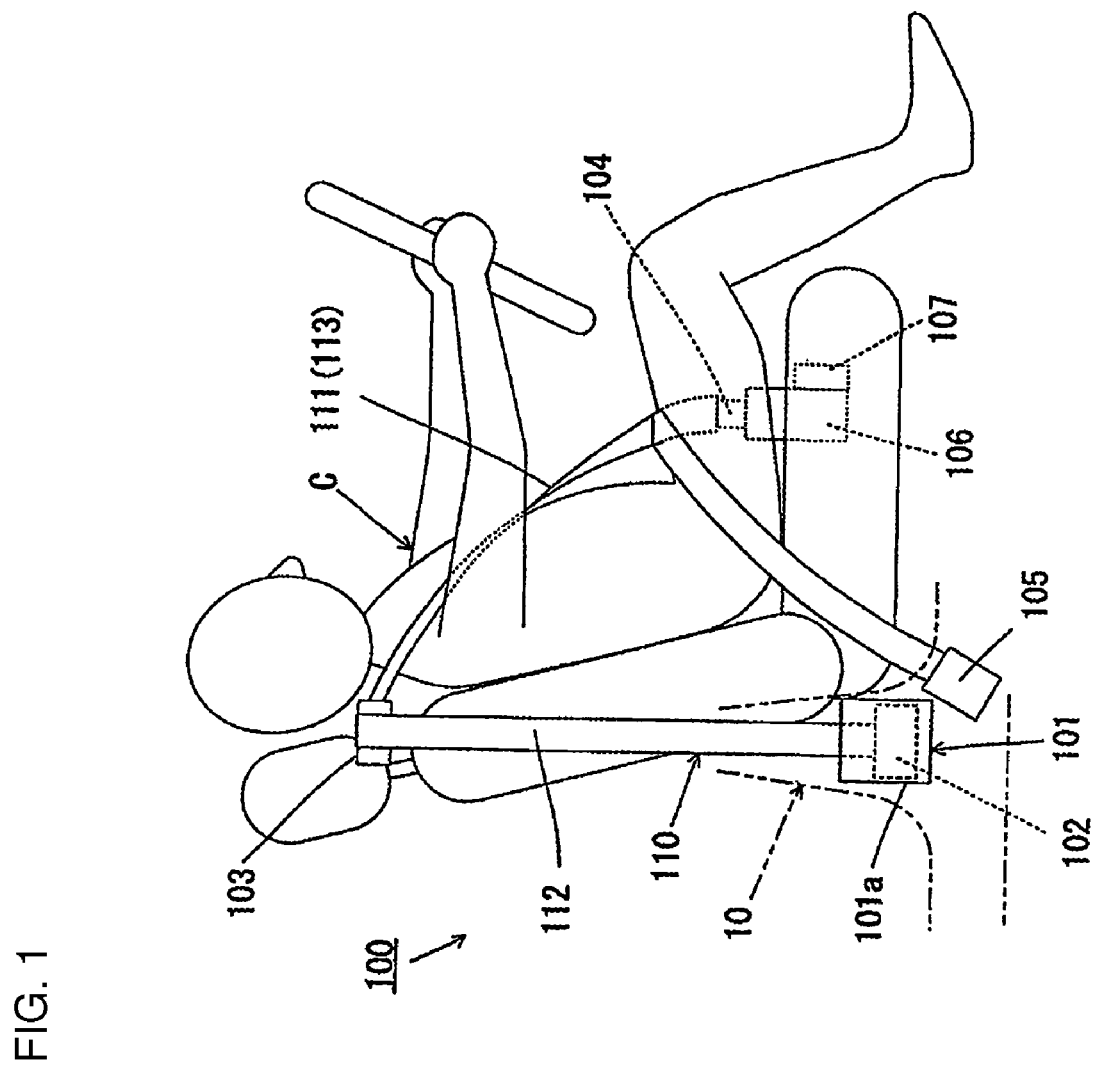
FIG. 1 is an illustration showing schematic structure of an inflatable belt apparatus according to an embodiment of the present invention.

As shown in FIG. 1, the inflatable belt apparatus 100 of this embodiment is an inflatable belt apparatus for an occupant sitting in a driver's seat installed in an automotive vehicle and mainly comprises a retractor 101, an inflatable belt 110, a tongue 104, a buckle 106, and a gas generator 107.

The retractor 101 of this embodiment is adapted to accommodate at least a cylindrical spool 102 in a retractor housing 101a and enables the winding and unwinding of the inflatable belt 110 via the spool 102. The spool 102 is driven by a driving means composed of a spring or a motor. The retractor 101 is installed in an accommodation space in a B-pillar 10 of the vehicle in the example shown in FIG. 1. The retractor 101 corresponds to "retractor" of the present invention.

The gas generator 107 is connected to the buckle 106 and functions as a gas generator for generating high-pressure gas in the event of a vehicle collision. The high-pressure gas generated by the gas generator 107 can be supplied into the gas bag 113 accommodated in the inflatable area 111 of the inflatable belt 110 through gas passages formed in the buckle 106 and a tongue 104, but not particularly shown.

The inflatable belt 110 of the present invention is a long belt for restraining a vehicle occupant C and is structured to be a belt (webbing) which is formed into a long band-like shape by using woven fabric or knitted fabric of synthetic fiber. The inflatable belt 110 corresponds to "inflatable belt" of the present invention. The inflatable belt 110 is sometimes called "seat belt for restraining an occupant".

The inflatable belt 110 extends through the tongue 104 via a deflection fitting 103, which is provided in an occupant's shoulder area of the vehicle occupant C, and is connected to an outer anchor 105. By inserting (latching) the tongue 104 into the buckle 106 fixed to the vehicle body, the inflatable belt 110 becomes a worn state relative to the vehicle occupant C. On the other hand, by cancelling the latching of the tongue 104 relative to the buckle 106, the wearing of the inflatable belt 110 relative to the vehicle occupant C is cancelled. The tongue 104 here corresponds to "tongue" of the present invention and the buckle 106 here corresponds to "buckle" of the present invention.

The inflatable belt 110 is configured with a stretchable webbing comprising at least an inflatable area 111 and a non-inflatable area 112. The inflatable area 111 of the inflatable belt 110 is a belt portion of which stretchability is higher than that of the non-inflatable area 112. The inflatable area 111 accommodates a gas bag 113 which is inflatable with gas supplied from the gas generator 107 and has such stretchability that the inflatable area 111 is inflated according to the inflation of the gas bag 113. The inflatable area 111 is arranged in front of a front surface area (area including chest, shoulders, and abdomen) of the vehicle occupant when the inflatable belt 110 is worn by the vehicle occupant. Therefore, the inflatable area 111 inflated can restrain the vehicle occupant in the event of a vehicle collision. On the other hand, the non-inflatable area 112 is a belt portion, not the inflatable area 111, which is not inflatable and has stretchability lower than that of the inflatable area 111. The non-inflatable area 112 has low stretchability as compared to the inflatable area 111 or little stretches. The non-inflatable area 112 has a wound portion to be wound onto the spool 102.

Figure 2:
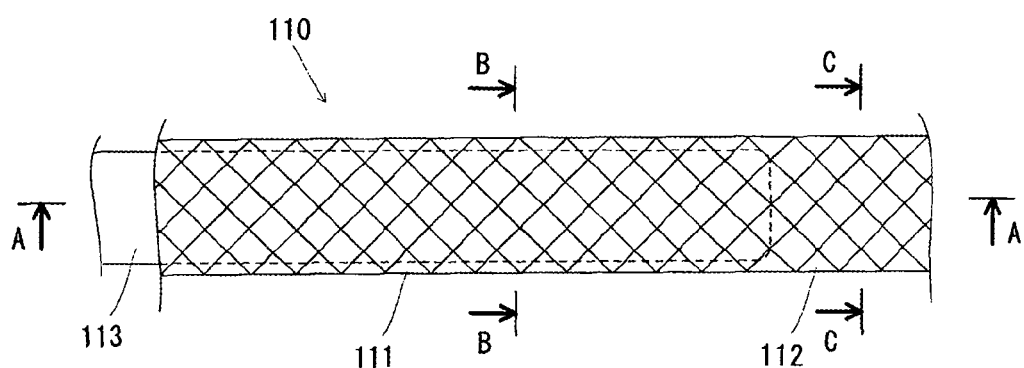
FIG. 2 is a plain view partially showing an inflatable belt of the embodiment.
Figure 3:
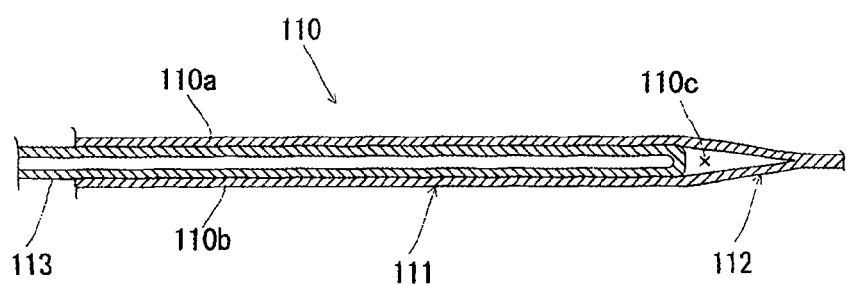
FIG. 3 is a sectional view of the inflatable belt taken along a line A-A in FIG. 2.
Figure 4:
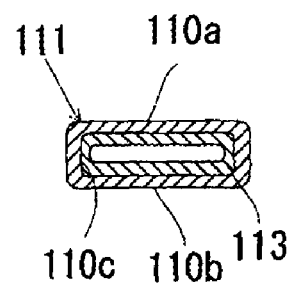
FIG. 4 is a sectional view of the inflatable belt taken along a line B-B in FIG. 2.
Figure 5:
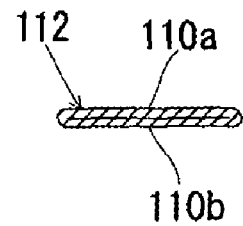
FIG. 5 is a sectional view of the inflatable belt taken along a line C-C in FIG. 2.

The specific structure of the aforementioned inflatable belt 110 will be referred to FIG. 2 through FIG. 5. FIG. 2 is a plain view partially showing the inflatable belt 110 of this embodiment. FIG. 3 is a sectional view taken along a line A-A of the inflatable belt 110 in FIG. 2, FIG. 4 is a sectional view taken along a line B-B of the inflatable belt 110 in FIG. 2, and FIG. 5 is a sectional view taken along a line C-C of the inflatable belt 110 in FIG. 2.

As shown in FIG. 2, the inflatable belt 110 of this embodiment is composed of a woven fabric (webbing 120 as will be described later) which comprises the inflatable area 111 and the non-inflatable area 112 continuously connected to the inflatable area 111 and which is formed in a cylindrical shape or an envelope shape by weaving or sewing. As shown in FIG. 3 and FIG. 4, the inflatable belt 110 is formed to be a flat member as a whole having a pair of flat faces 110a, 110b. As shown in FIG. 3 and FIG. 4, the inflatable area 111 is structured such that the gas bag 113 is accommodated in an accommodation space 110c formed between the flat faces 110a, 110b. On the other hand, as shown in FIG. 5, the non-inflatable area 112 is structured such that the flat faces 110a, 110b closely contact each other.

Figure 6:
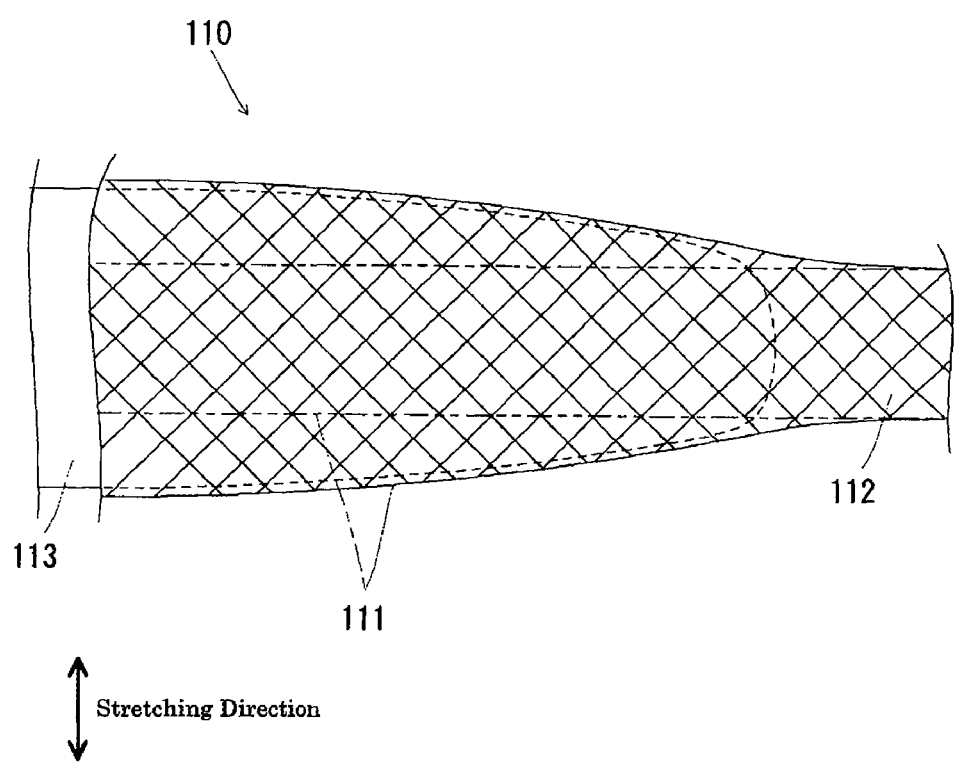
FIG. 6 is an illustration showing an inflated state of the inflatable belt in FIG. 2.

In the inflatable belt apparatus 100 having the aforementioned structure, high-pressure gas generated by the gas generator 107 in the event of a vehicle collision is supplied into the gas bag 113 accommodated in the inflatable area 111 of the inflatable belt 110. Accordingly, the gas bag 113 is inflated and the inflatable area 111 accommodating the gas bag 113 is also inflated according to the inflation of the gas bag 113 because of its stretchability. The inflated state of the inflatable area 111 will be referred to FIG. 6. FIG. 6 shows a state that the inflatable belt 110 shown in FIG. 2 is inflated. As shown in FIG. 6, the inflatable belt 110 is inflated in front of the front surface area (area including the chest, the shoulders, and the abdomen) of the vehicle occupant while the inflatable area 111 stretches in a stretching direction shown by arrows in FIG. 6 in the event of vehicle collision so that the vehicle occupant is restrained by the inflatable area 111.

Figure 7:
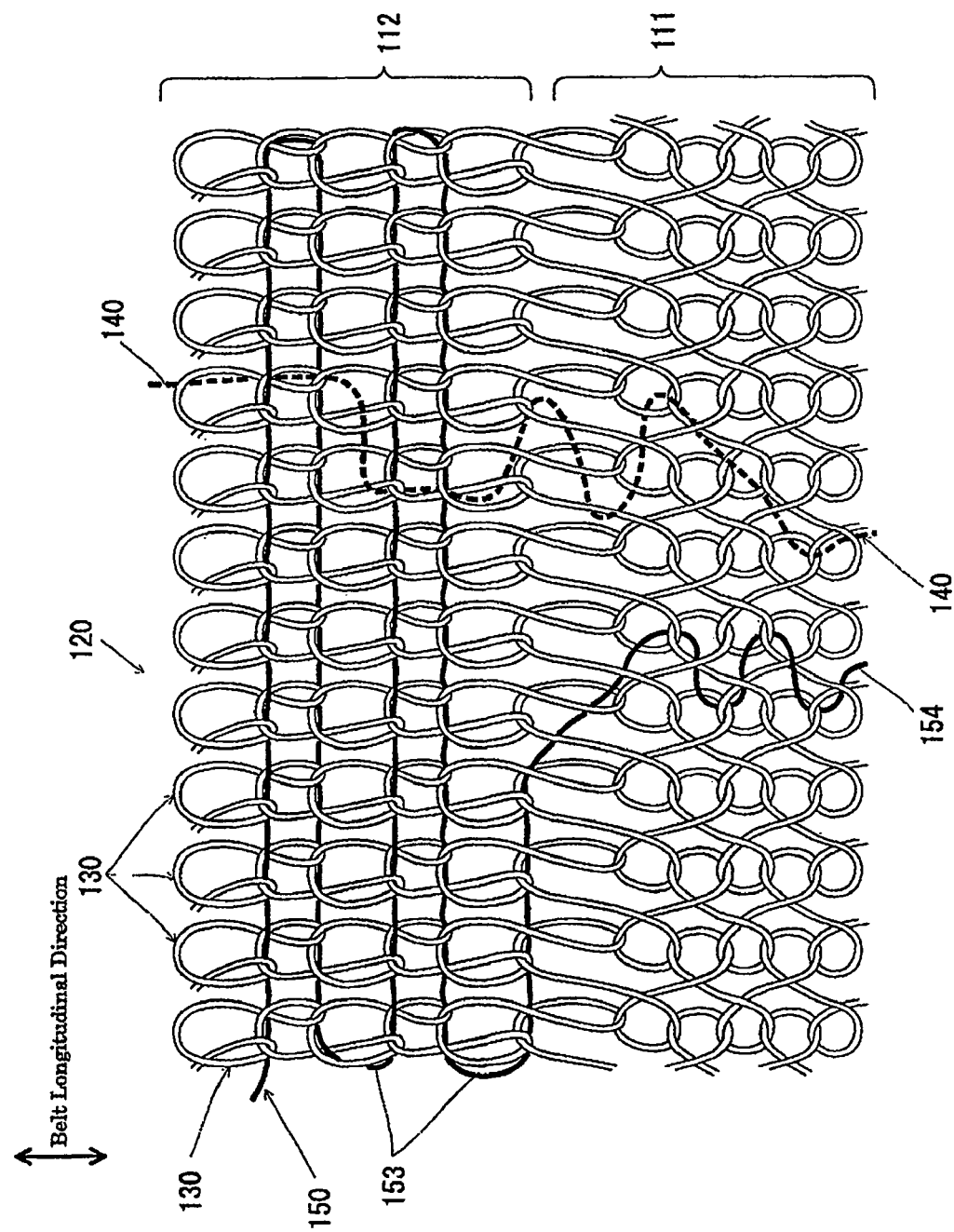
FIG. 7 is an illustration showing knitting structure of a webbing composing the inflatable belt of the embodiment.

The knitting structure of the webbing 120 composing the inflatable belt 110 of this embodiment will be referred to FIG. 7. As shown in FIG. 7, the webbing 120 of this embodiment is structured as a stretchable webbing comprising at least a plurality of knitting yarns 130, an inserting yarn 140, and a weft yarn 150. The webbing 120 here corresponds to "stretchable webbing" of the present invention.

Every knitting yarn 130 has the same knitting structure and has a structure extending lengthwise in the belt longitudinal direction (direction of arrows in FIG. 7) so as to form webbing framework of the webbing 120. The plurality of knitting yarns 130 are arranged to extend over the webbing, thereby forming the webbing framework of the webbing 120. The knitting yarns 130 here correspond to "knitting yarns" of the present invention. The inserting yarn 140 is inserted into spaces between the plurality of knitting yarns 130 to extend in the belt longitudinal direction. The inserting yarn 140 here corresponds to "inserting yarn" of the present invention. The weft yarn 150 is structured to have an extending yarn which is inserted into spaces between the plurality of knitting yarns 130 to extend in a direction perpendicular to the belt longitudinal direction. The weft yarn 150 here corresponds to "weft yarn" of the present invention.

Though there is no particular illustration, selvage yarns extend along both side edges of the webbing 120 to increase the strength of the both side edges of the webbing 120.

It is general that these yarns for forming the webbing, i.e. the knitting yarns 130, the inserting yarn 140, and the weft yarn 150 of this embodiment fundamentally extend in certain directions generally while repeating regular or irregular swells and twists. Each yarn may extend in one direction over all parts or extend generally in one direction with some swells and curves.

Especially, in the weft yarn 150 of this embodiment, a first extending part 153 extending in the non-inflatable area 112 extends to reciprocate a plurality of times in the width of the webbing 120 such that most of the first extending part 153 extends in the direction perpendicular to the belt longitudinal direction, so as to ensure high rigidity. On the other hand, also in the weft yarn 150, a second extending part 154 extending in the inflatable area 111 is arranged such that most of the second extending part 154 extends along the belt longitudinal direction, so as to ensure high stretchability as compared to that of the non-inflatable area 112. This stretchable structure of the inflatable area 111 allows smooth inflating action of the gas bag 113 accommodated in the inflatable area 111. The first extending part 153 here corresponds to "first extending part" of the present invention and the second extending part 154 here corresponds to "second extending part" of the present invention. The non-inflatable area 112 of the webbing 120 where the first extending part 153 extends corresponds to "first webbing area" of the present invention and the inflatable area 111 of the webbing 120 where the second extending part 154 extends corresponds to "second webbing area" of the present invention.

By the way, the webbing of this type composing the inflatable belt 110 as mentioned above is required to have performance which is effective in preventing fray (sometimes called "run") and another additional performance which is effective in reducing the product width in addition to the basic performance, i.e. having webbing rigidity capable of restraining the occupant in the event of a vehicle collision. The inventor of the present invention has keenly examined the structure which is effective in ensuring desired performance as for webbing of this type. As a result of the keen examination, webbing having the desired performance can be obtained by designing the knitting yarns 130, the inserting yarn 140, and the weft yarn 150 composing the webbing 120 to have respective structures as will be described below.

Figure 8:
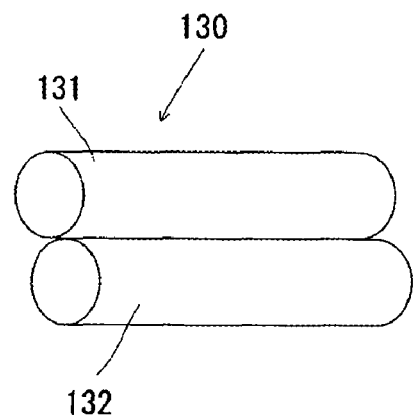
FIG. 8 is an illustration showing the structure of a knitting yarn of the embodiment.

The structure of the knitting yarn 130 of this embodiment will be referred to FIG. 8. As shown in FIG. 8, each knitting yarn 130 comprises a first filament 131 and a second filament 132 of which fusing points are different from each other and has a structure that the first filament 131 and the second filament 132 extend adjacent to and in parallel with each other. The knitting yarn 130 is also called a knitting yarn formed by tying the first filament 131 to the second filament 132. As a typical structure of the knitting yarn 130, the first filament 131 is composed of polyester fiber having a fusing point of from about 255° C. to about 260° C. and the second filament 132 is composed of modified polyester fiber (self-fusing thread) having a fusing point of from about 160° C. to about 180° C. That is, in this embodiment, the fusing point of the second filament 132 is lower than that of the first filament 131 so that the second filament 132 is easily fused as compared to the first filament 131. The modified polyester fiber is also called a low-fusing-point polyester fiber having a thermal adhesiveness because of the fusing point lower than that of polyester fiber.

Figure 9:
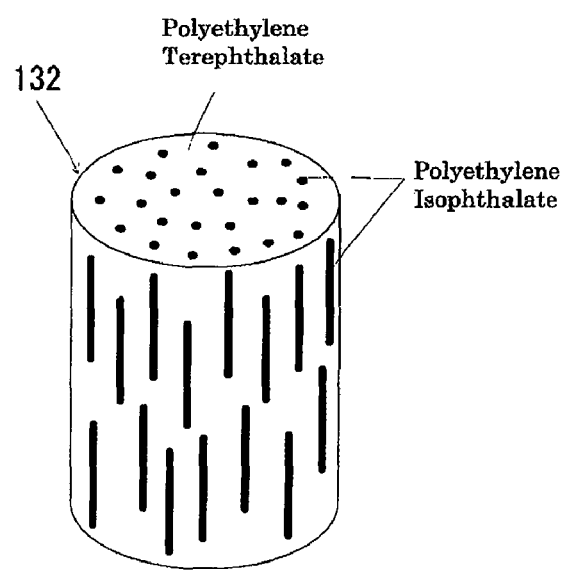
FIG. 9 is an illustration showing a specific structure of a modified polyester fiber composing a second filament of the knitting yarn 130 of the embodiment.

The polyester fiber composing the first filament 131 is typically made of a polymer of polyethylene terephthalate which is manufactured by esterification reaction of terephthalic acid with ethylene glycol. On the other hand, the modified polyester fiber (low-fusing-point polyester fiber) composing the second filament 132 is typically made of a copolymer of polyethylene terephthalate as mentioned above with polyethylene isophthalate which is manufactured by esterification reaction of terephthalic acid and isophthalic acid with ethylene glycol. Specific structure of the modified polyester fiber composing the second filament 132 in the knitting yarn 130 of this embodiment is shown in FIG. 9. As shown in FIG. 9, the modified polyester fiber is a copolymer in which polyethylene isophthalate is scattered in polyethylene terephthalate, that is, polyethylene isophthalate having the low fusing point is incorporated into polyethylene terephthalate having the high fusing point. It is preferable that the ratio of polyethylene isophthalate in the copolymer is 30% (the ratio of polyethylene terephthalate is 70%).

With the structure of the knitting yarn 130 as mentioned above, the polyethylene isophthalate (low-fusing-point fiber) having a fusing point lower than that of the polyethylene terephthalate in the second filament 132 is preferentially fused by thermal treatment at about 190° C. for thermoforming the webbing 120 so that the fused component functions as binder so as to thermally bond the knitting yarn 130 to other yarns (the inserting yarn 140 and the weft yarn 150). In this embodiment, the knitting yarn 130 is preferentially fused and is then hardened together with the inserting yarn 140 and the weft yarn 150, thereby increasing the sectional area and the hardness of the knitting yarn 130 after shrinkage and thus increasing the rigidity of the webbing as a whole. Therefore, this structure can prevent occurrence of aperture between yarns of the webbing 120, i.e. occurrence of so-called "slippage" and can improve the webbing rigidity. Since particularly the webbing rigidity of the non-inflatable area 112 to be wound onto the spool 102 can be improved, it is effective in improving the abrasion resistance (durability). Further, since the knitting yarn 130 is preferentially fused and is then hardened together with the inserting yarn 140 and the weft yarn 150, it is effective in preventing the fray especially in the inflatable area 111.

Figure 10:
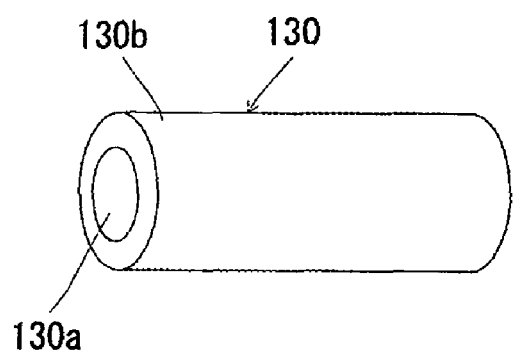
FIG. 10 is an illustration showing an alternative example of the structure of the knitting yarn of the embodiment.

As for the structure of the knitting yarn 130 of this embodiment, an alternative example shown in FIG. 10 may be employed. In the example shown in FIG. 10, the knitting yarn 130 is composed of a core-sheath structured yarn comprising a core portion 130a occupying the center of the yarn and a sheath portion 130b covering outside of the core portion 130a. In this case, the core portion 130a may be made of polyester fiber having a fusing point of from about 255° C. to about 260° C. similar to the first filament 131 and the sheath portion 130b may be made of modified polyester fiber having a fusing point of from about 160° C. to about 180° C. similar to the second filament 132. The webbing having the structure as mentioned above also can improve the abrasion resistance and prevent the fray when treated by thermoforming.

Figure 11:
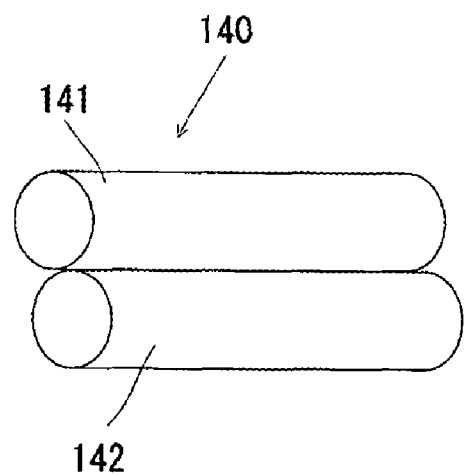
FIG. 11 is an illustration showing the structure of an inserting yarn of the embodiment.

The structure of the inserting yarn 140 of this embodiment will be referred to FIG. 11. As shown in FIG. 11, the inserting yarn 140 comprises a first filament 141 and a second filament 142 of which fusing points are different from each other and has a structure that the first filament 141 and the second filament 142 extend adjacent to and in parallel with each other. The inserting yarn 140 is also called an inserting yarn formed by tying the first filament 141 to the second filament 142. As a typical structure of the inserting yarn 140, the first filament 141 is composed of polyester fiber having a fusing point of from about 255° C. to about 260° C. and the second filament 142 is composed of modified polyester fiber (self-fusing thread) having a fusing point of from about 160° C. to about 180° C. That is, in this embodiment, the fusing point of the second filament 142 is lower than that of the first filament 141 so that the second filament 142 is easily fused as compared to the first filament 141. The modified polyester fiber is also called a low-fusing-point polyester fiber having a thermal adhesiveness because of the fusing point lower than that of polyester fiber.

Figure 12:
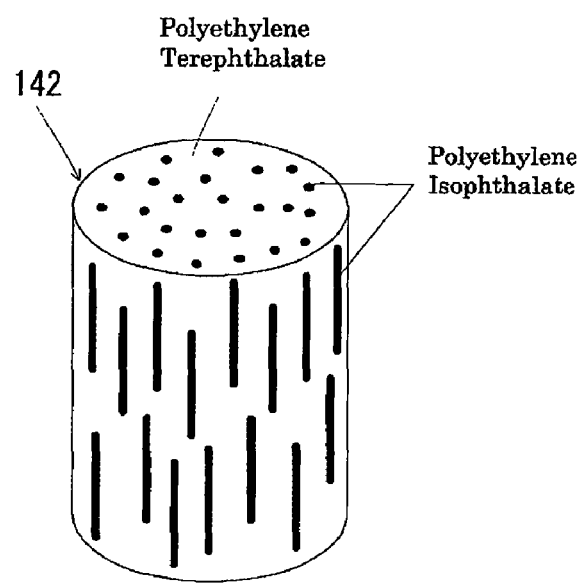
FIG. 12 is an illustration showing a specific structure of a modified polyester fiber composing a second filament of the inserting yarn of the embodiment.

The polyester fiber composing the first filament 141 has the same structure as the first filament 131 of the knitting yarn 130 and is typically made of a polymer of polyethylene terephthalate which is manufactured by esterification reaction of terephthalic acid with ethylene glycol. On the other hand, the modified polyester fiber (low-fusing-point polyester fiber) composing the second filament 142 has the same structure as the second filament 132 of the knitting yarn 130 and is typically made of a copolymer of polyethylene terephthalate as mentioned above with polyethylene isophthalate which is manufactured by esterification reaction of terephthalic acid and isophthalic acid with ethylene glycol. Specific structure of the modified polyester fiber composing the second filament 142 in the inserting yarn 140 of this embodiment is shown in FIG. 12. As shown in FIG. 12, the modified polyester fiber is a copolymer in which polyethylene isophthalate is scattered in polyethylene terephthalate, that is, polyethylene isophthalate having the low fusing point is incorporated into polyethylene terephthalate having the high fusing point. It is preferable that the ratio of polyethylene isophthalate in the copolymer is 30% (the ratio of polyethylene terephthalate is 70%).

With the structure of the inserting yarn 140 as mentioned above, the polyethylene isophthalate (low-fusing-point fiber) having a fusing point lower than that of the polyethylene terephthalate in the second filament 142 is preferentially fused by thermal treatment at about 190° C. for thermoforming the webbing 120 so that the fused component functions as binder so as to thermally bond the inserting yarn 140 to other yarns (the knitting yarns 130 and the weft yarn 150). In this embodiment, the inserting yarn 140 is preferentially fused and is then hardened together with the knitting yarns 130 and the weft yarn 150, thereby increasing the sectional area and the hardness of the inserting yarn 140 after shrinkage and thus increasing the rigidity of the webbing as a whole. Therefore, this structure can prevent occurrence of aperture between yarns of the webbing 120, i.e. occurrence of so-called "slippage" and can improve the webbing rigidity. Since particularly the webbing rigidity of the non-inflatable area 112 to be wound onto the spool 102 can be improved, it is effective in improving the abrasion resistance (durability). Further, since the inserting yarn 140 is preferentially fused and is then hardened together with the knitting yarns 130 and the weft yarn 150, it is effective in preventing the fray especially in the inflatable area 111.

Figure 13:
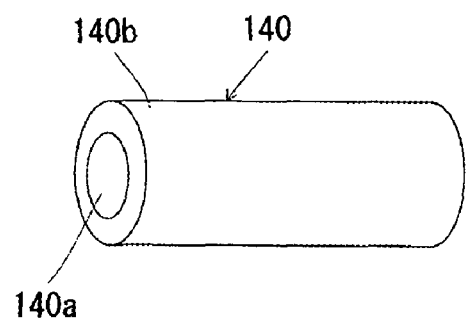
FIG. 13 is an illustration showing an alternative example of the structure of the inserting yarn of the embodiment.

As for the structure of the inserting yarn 140 of this embodiment, an alternative example shown in FIG. 13 may be employed. In the example shown in FIG. 13, the inserting yarn 140 is composed of a core-sheath structured yarn comprising a core portion 140a occupying the center of the yarn and a sheath portion 140b covering outside of the core portion 140a. In this case, the core portion 140a may be made of polyester fiber having a fusing point of from about 255° C. to about 260° C. similar to the first filament 141 and the sheath portion 140b may be made of modified polyester fiber having a fusing point of from about 160° C. to about 180° C. similar to the second filament 142. The webbing having the structure as mentioned above also can improve the abrasion resistance and prevent the fray when treated by thermoforming.

Figure 14:
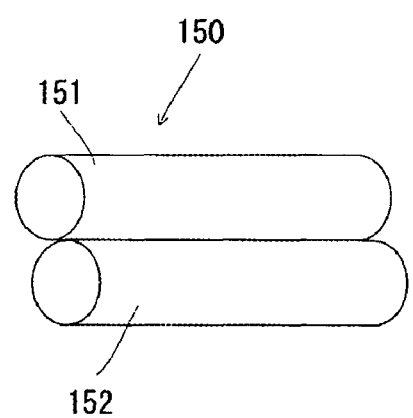
FIG. 14 is an illustration showing the structure of a weft yarn of the embodiment.

The structure of the weft yarn 150 of this embodiment will be referred to FIG. 14. As shown in FIG. 14, the weft yarn 150 comprises a first filament 151 and a second filament 152 of which fusing points and heat-shrinkage ratios (degrees of shrinkage in the longitudinal direction of fibers) are different from each other and has a structure that the first filament 151 and the second filament 152 extend adjacent to and in parallel with each other. The weft yarn 150 is also called a weft yarn formed by tying the first filament 151 to the second filament 152. As a typical structure of the weft yarn 150, the first filament 151 is composed of polyester fiber having a fusing point of from about 255° C. to about 260° C. and a heat-shrinkage ratio of from about 7% to about 11% and the second filament 152 is composed of modified polyester fiber (highly shrinkable thread) having a fusing point of about 230° C. and a heat-shrinkage ratio of about 18.5%. That is, in this embodiment, the heat-shrinkage ratio of the second filament 152 is higher than that of the first filament 151 so that the second filament 152 is easily shrank as compared to the first filament 151. The modified polyester fiber is also called a highly shrinkable polyester fiber having a heat-shrinkage ratio higher than that of polyester fiber. The heat-shrinkage ratio used here is obtained in a manner that a dipping treatment of dipping a test piece having a predetermined length in hot water is conducted and a ratio between the length of the test piece before the dipping treatment and the length of the test piece after the dipping treatment. The heat-shrinkage ratio is also called "hot water shrinkage ratio", "wet heat shrinkage ratio", "filament shrinkage ratio", "boiling water shrinkage ratio", or "shrinkage in boiling water". Typically, relative to a test piece subjected to dipping treatment in hot water for a predetermined time period in accordance with a method defined in JIS L1013 8.18.1(b), the evaluation is carried out according to a value (heat-shrinkage ratio) derived by an expression ((length before treatment−length after treatment)/length before treatment)×100.

Figure 15:
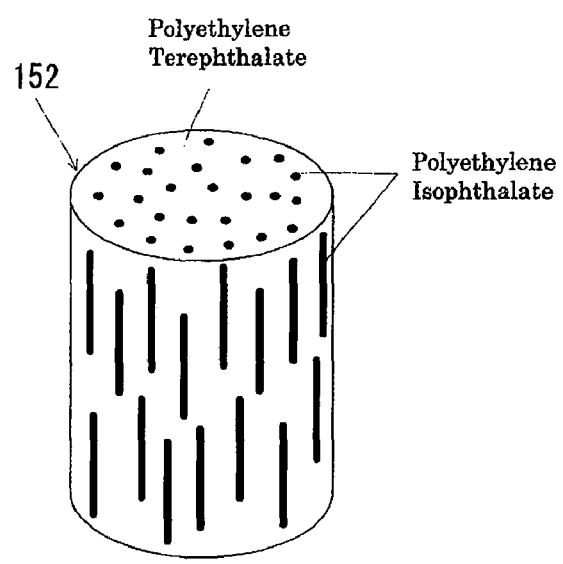
FIG. 15 is an illustration showing a specific structure of a modified polyester fiber composing a second filament of the weft yarn of the embodiment.

The polyester fiber composing the first filament 151 has the same structure as the first filament 131 of the knitting yarn 130 and is typically made of a polymer of polyethylene terephthalate which is manufactured by esterification reaction of terephthalic acid with ethylene glycol. On the other hand, the modified polyester fiber (high-shrinkable polyester fiber) composing the second filament 152 is typically made of a copolymer of polyethylene terephthalate as mentioned above with polyethylene isophthalate which is manufactured by esterification reaction of terephthalic acid and isophthalic acid with ethylene glycol. Specific structure of the modified polyester fiber composing the second filament 152 in the weft yarn 150 of this embodiment is shown in FIG. 15. As shown in FIG. 15, the modified polyester fiber is a copolymer in which polyethylene isophthalate is scattered in polyethylene terephthalate, that is, polyethylene isophthalate having the low fusing point is incorporated into polyethylene terephthalate having the high fusing point. It is preferable that the ratio of polyethylene isophthalate in the copolymer is 10% (the ratio of polyethylene terephthalate is 90%). The first filament 151 here corresponds to "first filament element" and "first filament" of the present invention and the second filament 152 here corresponds to "second filament element" and "second filament" of the present invention.

With the structure of the weft yarn 150 as mentioned above, the second filament 152 having a relatively high heat-shrinkage ratio is preferentially shrunk by thermal treatment at about 190° C. for thermoforming the webbing 120. Since particularly the webbing rigidity of the non-inflatable area 112 to be wound onto the spool 102 can be improved, it is effective in improving the abrasion resistance (durability). Further, it enables reduction in product width in a direction (width direction) perpendicular to the belt longitudinal direction at the non-inflatable area 112.

Figure 16:
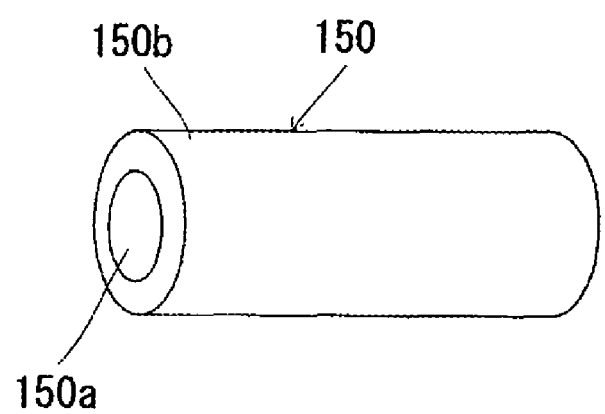
FIG. 16 is an illustration showing an alternative example of the structure of the weft yarn of the embodiment.

As for the structure of the weft yarn 150 of this embodiment, an alternative example shown in FIG. 16 may be employed. In the example shown in FIG. 16, the weft yarn 150 is composed of a core-sheath structured yarn comprising a core portion 150a occupying the center of the yarn and a sheath portion 150b covering outside of the core portion 150a. In this case, the core portion 150a may be made of polyester fiber having a fusing point of from about 255° C. to about 260° C. and a heat-shrinkage ratio of from about 7% to about 11% similar to the first filament 151 and the sheath portion 150b may be made of modified polyester fiber (highly shrinkable thread) having a fusing point of about 230° C. and a heat-shrinkage ratio of about 18.5% similar to the second filament 152. The webbing having the structure as mentioned above also can improve the abrasion resistance and reduce the product width when treated by thermoforming. The core portion 150a here corresponds to "core portion" and "first filament element" of the present invention and the sheath portion 150b here corresponds to "sheath portion" and "second filament element" of the present invention.

As for the structure of the aforementioned weft yarn 150, the first filament 151 may be composed of a modified polyester resin (self-fusing thread) similar to the second filament 132 of the knitting yarn 130. In this case, the first filament 151 is typically composed of a copolymer of polyethylene terephthalate as mentioned above with polyethylene isophthalate which is manufactured by esterification reaction of terephthalic acid and isophthalic acid with ethylene glycol. It is preferable that the ratio of polyethylene isophthalate in the copolymer is 30% (the ratio of polyethylene terephthalate is 70%). The first filament 151 is a modified polyester resin having a fusing point of from about 160° C. to about 180° C. and a heat-shrinkage ratio of from about 7% to about 11%.

According to the structure as mentioned above, the polyethylene isophthalate (low-fusing-point fiber) having a fusing point lower than that of the polyethylene terephthalate in the first filament 151 is preferentially fused so that the fused component functions as binder so as to thermally bond the weft yarn 150 to other yarns (the knitting yarns 130 and the inserting yarn 140). Therefore, while improving the abrasion resistance and reducing the product width when treated by thermoforming, the weft yarn 150 is preferentially fused and is then hardened together with the knitting yarns 130 and the inserting yarn 140, thereby increasing the sectional area and the hardness of the weft yarn 150 after shrinkage and thus increasing the rigidity of the webbing as a whole. Therefore, this structure can prevent occurrence of aperture between yarns of the webbing 120, i.e. occurrence of so-called "slippage" and is effective in preventing fray particularly in the inflatable area 111.

As for the structure of the weft yarn 150 as mentioned above, the weft yarn 150 may be composed only of the second filament 152 having a heat-shrinkage ratio higher than that of the other yarns (the knitting yarns 130 and the inserting yarn 140). According to this structure, the weft yarn 150 (the second filament 152) is preferentially shrunk by thermal treatment at about 190° C. for thermoforming the webbing 120 because the weft yarn 150 (the second filament 152) has a relatively high heat-shrinkage ratio as compared to the knitting yarns 130 and the inserting yarn 140. The webbing of this structure also can provide improved durability and reduced product width when treated by thermoforming.

The present invention is not limited to the aforementioned embodiments and various applications and modifications may be made. For example, the following respective embodiments based on the aforementioned embodiments may be carried out.

Though the aforementioned embodiment has been described with reference to a case that both the knitting yarns 130 and the inserting yarn 140 contain low-fusing-point polyester fibers, the kind of fibers composing the knitting yarns 130 and the inserting yarn 140 may be changed if necessary. For example, the knitting yarns 130 and the inserting yarn 140 may be composed only of polyester fibers of which fusing points are of from 255° C. to 260° C.

The aforementioned embodiment has been described with reference to a case that the second filament 152 of the weft yarn 150 is composed of fiber (highly shrinkable polyester fiber) having a heat-shrinkage ratio higher than that of the first filament 151 so that the second filament 152 is easily shrunk as compared to the first filament 151. However, in the present invention, the weft yarn 150 itself or a filament contained in the weft yarn 150 may be composed of fiber having a heat-shrinkage ratio higher than that of the other yarns (the knitting yarns 130 and the inserting yarn 140). According to this structure, the weft yarn 150 itself or the filament contained in the weft yarn 150 is shrunk prior to the other yarns by thermal treatment for thermoforming the webbing 120, thereby increasing the webbing rigidity and thus improving the abrasion resistance (durability) of the webbing 120 and also achieving the reduced product width of the webbing 120.

Though the aforementioned embodiments have been described with regard to the inflatable belt apparatus 100 for restraining the occupant sitting in the driver's seat of an automotive vehicle, the present invention is not limited to that for the driver's seat of the automotive vehicle and can be adapted to inflatable belt apparatuses for restraining an occupant sitting in a front passenger seat or a rear seat and also adapted to inflatable belt apparatus to be installed in various vehicles such as a bus, a truck, an airplane, and a boat.

What is claimed is:

1. An inflatable belt apparatus comprising:
a seat belt assembly;
a retractor;
a releasable locking mechanism for releasably securing the seat belt assembly about a vehicle occupant;
an inflatable bag associated with a stretchable portion of the seat belt assembly; and
a compacted weft yarn of the seat belt assembly extending across the entire lateral extent of a rigid portion of the seat belt assembly configured and arranged to allow for the rigid portion to be received in the retractor,
wherein the stretchable portion and rigid portion include an inserting yarn and knitting yarns extending longitudinally, and the inserting, knitting and weft yarns are of polymeric material thermally treated at a predetermined temperature so at least a portion of the inserting yarn and a portion of the knitting yarns are melted and fused to the other yarns, and so that the weft yarn shrinks more than the inserting yarn and the knitting yarns.

2. The inflatable belt apparatus of claim 1, wherein the inflatable bag is disposed within the stretchable portion.

3. The inflatable belt apparatus of claim 2, wherein the stretchable portion has a hollow configuration and is not received in the retractor.

4. The inflatable belt apparatus of claim 1, wherein the inflatable bag is cylindrical.

5. The inflatable belt apparatus of claim 1, wherein the inflatable bag has an envelope shape.

6. The inflatable belt apparatus of claim 1 wherein the stretchable portion includes the weft yarn so as to not extend across the entire lateral extent of the stretchable portion.

7. The inflatable belt apparatus of claim 1 wherein the weft yarn includes a first weft filament and a second weft filament, the first weft filament having a first heat-shrinkage ratio, the second weft filament having a second heat-shrinkage ratio, the second heat-shrinkage ratio being higher than the first heat-shrinkage ratio.

8. The inflatable belt apparatus of claim 7, wherein the first weft filament and the second weft filament extend adjacent and parallel to each other.

9. The inflatable belt apparatus of claim 7, wherein the first weft filament is a core portion, the second weft filament is a sheath portion, the core portion disposed within the sheath portion.

10. The inflatable belt apparatus of claim 7, wherein the first weft filament has a first fusing point, the second weft filament has a second fusing point, the first fusing point being lower than the second fusing point, with the first and second weft filaments being adjacent so that heating of the weft yarn to a temperature of at least the first fusing point but below the second fusing point bonds the first weft filament to the knitting yarns, and the second weft filament to the knitting yarns with the first weft filament.

* * * * *